United States Patent Office 2,871,268
Patented Jan. 27, 1959

2,871,268

TREATMENT OF VERBENYL ETHERS

Joseph P. Bain, Albert B. Booth, Harry G. Hunt, and Eugene A. Klein, Jacksonville, Fla., assignors to The Glidden Company, Cleveland, Ohio, a corporation of Ohio No Drawing. Application December 10, 1953
Serial No. 397,464

18 Claims. (Cl. 260—587)

The present invention relates to the treatment of verbenyl ethers, and particularly to the conversion of verbenyl ethers to compounds of the p-menthane series.

In copending application Serial No. 368,208, filed July 15, 1953, there is disclosed a method for producing verbenyl ethers. These ethers are, in turn, prepared from products obtained by the air oxidation of α-pinene, which is a major constituent of American turpentine. Thus, verbenyl ethers are readily and cheaply prepared.

It is the purpose of the present invention to convert the verbenyl ethers into products useful per se and as intermediates useful in the production of other valuable materials such as menthol.

It is accordingly an object of the present invention to provide a process for converting verbenyl ethers into useful products.

Another object is to convert verbenyl ethers into compounds of the p-menthane series.

Another object is to convert verbenyl ethers into compounds useful for the production of menthyl compounds.

Another object is to produce certain new and valuable terpene ethers.

Other objects will be apparent from the following disclosure.

It has been found that the foregoing objects can be accomplished by pyrolyzing verbenyl ethers, whereby there are formed ethers of 1,8-p-menthadiene-3-ol, isopiperitenol ethers having the Formula IV. These isopiperitenol ethers are useful as odorants, as special solvents and for other known applications of terpene ethers. They are also useful in the production of menthone, menthols and other alcohols and carbonylic materials, as will be more fully disclosed hereinafter.

In addition to the isopiperitenyl ethers, there is also formed some pseudo-verbenyl ether, Formula II, and some acyclic ethers, a representative example of which is represented by Formula III.

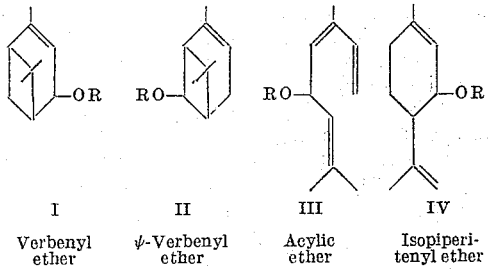

| I | II | III | IV |
|---|---|---|---|
| Verbenyl ether | ψ-Verbenyl ether | Acylic ether | Isopiperitenyl ether |

In Formula I, verbenyl ether, the R group can be the residue of any suitable alcohol provided it is not thermally decomposable to produce decomposition products having an adverse effect on the reaction. Thus R can be any hydrocarbon or substituted hydrocarbon radical, derived from an alcohol, which is not deleteriously decomposed. Such substituents as halogen would split off to form hydrogen halide, which because of its acidity would cause conversion of the ethers to hydrocarbons and resinous materials. The ethers of lower alkyl, cycloalkyl and aralkyl alcohols are preferred, although other ethers can be treated, such as, for example, the mono- and diglycol ethers of Serial No. 368,208. Phenol ethers, however, should not be used, since, as described in Serial No. 368,208, they yield o-verbenyl phenols on heating. Thus, in Formula I, R should be a

radical wherein $R_1$, $R_2$ and $R_3$ can be hydrogen, hydrocarbon or substituted hydrocarbon radicals.

In addition to the above-mentioned products, there is also formed on pyrolysis some carbonyl compound or compounds. The structure of these compounds has not been determined, but since they contain oxygen double bonded to the terpene, the transfer of the R group is indicated.

The proportions of the individual pyrolytic products can be varied to some extent by changing the pyrolytic conditions, although, in general, time and temperature are inversely proportional in bringing about the thermal isomerization. The R group also has some effect on the distribution of the pyrolytic products.

The pyrolysate can be fractionally distilled to obtain the isopiperitenyl ether and/or the other ethers in more or less pure state. The isopiperitenyl ether can then be hydrogenated to the menthyl ether. Some control over the stereoisomeric form of the menthyl ether produced can be had by suitable choice of hydrogenation catalyst. Thus, from trans-isopiperitenyl methyl ether produced by pyrolysis of trans-verbenyl methyl ether, there can be produced upon complete hydrogenation either the isomenthyl methyl ether or the menthyl methyl ether depending upon which position the methyl group takes. For example, from d-trans-verbenyl methyl ether, there is produced d-trans-isopiperitenol methyl ether which hydrogenates to d-isomenthyl methyl ether and/or d-menthyl methyl ether. The d-isomenthyl methyl ether is a member of the l-menthol family, and can be converted to l-menthol by cleavage of the ether to d-isomenthol, which can be converted to l-menthol by known means.

An alternate route is the hydrolysis of the d-trans-isopiperitenyl methyl ether to d-trans-isopiperitenol, which on hydrogenation gives d-isomenthol as the predominant product. The cis forms of the isopiperitenol yield neomenthols as the predominant products on hydrogenation.

Still another path to menthol would be by demethoxylation of the menthyl ether to 3-menthene and conversion of this hydrocarbon to menthol by known methods. Optical activity can also be retained throughout this procedure.

Thus, by choice of a suitable verbenyl ether having the proper sign, it is possible to prepare the optically active menthol having the desired sign. If an optically active product is to be produced via isopiperitenone or piperitone, proper precautions must be observed in handling these easily racemized ketones. This is well known in the art. The other products are not readily racemized.

It will be understood that the optical activity of the menthol produced by any of the above paths can only be proportional to the optical activity of the starting verbenyl ether, and from racemic starting material only racemic menthols can be produced unless a resolution procedure is resorted to.

The following examples are illustrative:

*Example 1*

500 grams of l-trans-verbenyl methyl ether was heated in a stainless steel bomb for 6 hours at 250° C. The infrared spectrogram of the crude product showed a terminal methylene absorption at about 11.2μ equivalent to over 40% of isopiperitenyl methyl ether, about 5 mol percent of methanol or less, and a small amount of conjugated carbonyl absorption. The ether retention was excellent as judged by retention of the high optical density of the absorption bands characteristic of this linkage. This product was fractionated at 10 mm.

Below 70° C. at 10 mm., a small amount of hydrocarbon containing some cymene was recovered, corresponding to the small amount of methanol split out. The hydrocarbon fractions had low positive rotations, indicating the presence of hydrocarbon having the phellandrene-type structure.

The next 15% of material boiled between 70° C. and 80° C. at 10 mm., and the fractions passed through a maximum negative rotation. These fractions contained the unreacted verbenyl methyl ether, but were contaminated with material of higher refractive index. The rest of the distillate distilled between 80° C. and 85° C./10 mm., and was characterized by a slow fall of the refractive index and a rise in rotation values as the fractions became poorer in the conjugated acyclics and richer in the optically active isopiperitenyl methyl ether. The purest fraction of the isopiperitenyl methyl ether, boiling at about 84° C./10 mm., had $n_D^{25}$ 1.4741 and $\alpha_D$ —63.3° (10 cm. tube). Its purity was assumed to be 100% for the purpose of estimating the composition of the crude pyrolysate and various fractions.

Each of the fractions was assayed by infrared spectrophotometry and the cumulative total of isopiperitenyl methyl ether for the entire distillate was a little better than 40%.

A fraction of isopiperitenyl methyl ether from the above distillation was stirred and refluxed with water for 10 hours. In this time the infrared spectrogram showed the presence of about 30% terpene alcohol hydroxyl absorptions, appropriate loss of density of the methoxyl absorption, but no detectable loss of terminal methylene absorptions. The treatment with water was continued for an additional 14 hours. The material by this time contained about 45% terpene alcohol and much remaining ether. The presence of a hydrocarbon having conjugated unsaturation in the ring was noted—doubtless the dehydration product of isopiperitenol. The mixture of alcohols produced by the hydrolysis of the ether was oxidized with dichromate and sulfuric acid to give isopiperitenone, all of the alcohols yielding the same ketone. Identification of the isopiperitenone was made by comparison of the infrared absorption spectrum of the oxidate with that of an authentic sample of isopiperitenone.

A small amount of isopiperitenyl methyl ether was oxidized with Beckmann's chromic acid mixture. The characteristic odor of isopiperitenone was apparent in the oxidation mixture.

Example 2

465 grams of l-trans-verbenyl methyl ether was pyrolyzed by heating in a stainless steel bomb at 250° C. for 15 hours. The infrared spectrogram of this material indicated 54% of a compound containing the $CH_2=C<$ group.

459 grams of the above product was reduced with 5 grams of nickel catalyst under a hydrogen pressure of 1500 p. s. i. g., maximum, at 120° C. until no further absorption of hydrogen took place. Comparison of the infrared spectrogram of the reduction product with that of an authentic sample of isomenthyl methyl ether, which had been produced by heating sodium isomenthylate and methyl iodide, showed the presence of a considerable amount of the latter.

On fractionation of the hydrogenated material, there was obtained besides isomenthyl methyl ether other methyl ethers whose structures have not yet been determined and a terpene alcohol which appears to be a primary alcohol. The source of the alcohol was the carbonyl material formed in the pyrolysis of the ether. As the alcohol is different from those obtained from verbenol, it is concluded that the methyl group of the methoxyl radical is transferred analogously to, though less readily than, the hydrogen of the hydroxyl radical when carbon-to-carbon cleavage occurs at a carbon atom carrying the hydroxy group, as illustrated by the following skeleton equations:

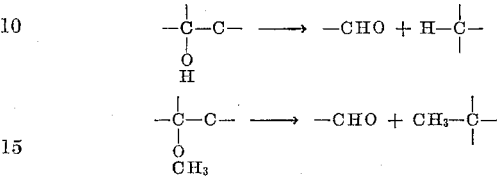

Example 3 l-Trans-verbenyl methyl ether was pyrolyzed in the vapor state by passing it through an externally heated iron pyrolysis unit consisting of a 3-foot length of ¼ inch I. D. standard iron pipe at the rate of 2 cc. of liquid per minute. Infrared spectrograms of the product run at different temperatures showed that at 300° C. there was very little change, but at 400° C. the isomerization of the ether was almost complete. The temperature necessary to achieve substantial isomerization of the ether is inversely dependent upon the contact time. The distribution of products is also somewhat different at different operating temperatures. The infrared spectrogram of the material pyrolyzed at 400° C. showed the following data:

(1) There were no hydroxyl groups present.

(2) Conjugated carbonyl compounds were present in greater amounts than in Examples 1 and 2, but amounted to less than 25% of the pyrolysate, as determined from conjugated carbonyl bands at 5.9–6.2μ.

(3) The carbon-hydrogen absorption at 7.2–7.3μ indicated an isopropenyl or isopropylidene group.

(4) The ether absorption at 9.1–9.2μ was present but showed some reduction from the starting material as would be expected in view of the formation of carbonyl compounds.

(5) Terminal methylene absorption, $CH_2=C<$, at 11.2–11.3μ, which serves as good evidence for the presence of isopiperitenyl methyl ether in view of the above examples.

Example 4

From the fractionation of pyrolyzed verbenyl methyl ether, Example 1, there was obtained a small amount of an ether boiling at 68–70° C./10 mm., which possessed optical activity but was neither verbenyl methyl ether nor isopiperitenyl methyl ether, although its boiling point and its infrared spectrogram showed it resembled the former rather than the latter. On shaking with 25% sulfuric acid it was slowly converted to pseudo-cyclocitral, 4,6,6-trimethyl - 3 - cyclohexene - 1 - carboxyaldehyde, V. The conversion was more rapid but was accompanied by resinification if the hydrolysis mixture was heated. Since the structure of pseudo-cyclocitral has been determined, see copending application Serial No. 348,825, filed April 14, 1953, the structure of the verbenyl methyl ether isomer is concluded to be as shown in Formula II wherein R is —$CH_3$.

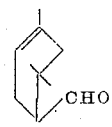

V ψ-Cyclocitral

The following are the principal infrared absorption bands for pseudo-verbenyl ether (μ): 13.75, 12.6, 12.0, 11.25, 11.1, 10.4, 10.25, 9.85, 9.56, 9 center (ether broad), 8.35, 8.08, 7.46, 7.32, 7.25, 6.9. The most characteristic are the bands at 12.6 and 12.0μ and the position of the ether band which differs from that of the isomeric normal verbenyl ether.

Example 5

Verbenyl isopropyl ether was prepared from verbenol and isopropanol. The verbenol was prepared from half active d-α-pinene, and possessed about half the optical rotation of fully active d-verbenol. The isopropyl verbenyl ether was a mixture of cis- and trans-forms.

2868 grams of this verbenyl isopropyl ether was pyrolyzed in a stainless steel bomb for 10 hours at 250° C., cooled and fractionally distilled at 10 mm., using an efficient column. A total of 48 fractions were taken, and a number of these were examined by infrared spectrophotometry. Except for a small amount of hydrocarbons, amounting to not over 3%, and the distillation residue, the fractions were all predominantly or exclusively ethers. A little carbonyl containing material occurred in some fractions.

The following table shows a breakdown of the isomerizate.

| Product | Percent of Pyrolyzate | B., °C., 10 mm. | Remarks |
| --- | --- | --- | --- |
| Hydrocarbons | 2.8 | 45–60 | Contains cymene. |
| Ψ Verbenyl isopropyl ether A. | 5.5 | 78–80 | Probably cis. |
| Ψ Verbenyl isopropyl ether B. | 6.3 | 80–83 | Probably trans (levo) |
| Verbenyl isopropyl ether | 4.7 | 84–87 | |
| Isopiperitenyl isopropyl ether. | 54.0 | 90–92 | Probably cis contaminated with trans; not pure. |
| Do | | 95–96 | Probably trans. Cis-grades slowly into trans as distillation proceeds. Best $\alpha_{10}=+38.8$. |
| Conjugated carbonyl compounds. | 1.0 | 99 and up | Probably polymerized acyclics. |
| Residue | 19.2 | | |
| Loss on distillation | 6.5 | | |
| | 100.0 | | |

The ψ verbenyl isopropyl etheds had the two infrared absorptions at 12.6 and 12.0 microns which characterized the verbenyl methyl ether, and the ether absorption was also shifted from the position of the normal ether. This seems to be characteristic of the ψ verbenyl ethers which have the ether group attached directly to the cyclobutane ring. The cis- and trans-configurations are assigned according to the behavior or known members of the verbenyl and isopiperitenyl series, where the cis-form tends to be lower boiling than the trans.

The isopiperitenyl isopropyl ethers are well characterized by their infrared absorption spectra, which show in addition to the ether group, the isopropenyl group and the $\Delta^{-1}$ double bond in the ring.

Example 6

A 45-gram fraction from the pyrolysis of verbenyl isopropyl ether rich in trans-isopiperitenyl isopropyl ether was hydrogenated with 0.45 g. platinum oxide under a hydrogen pressure of 50 p. s. i. g. maximum. The hydrogenation was interrupted when about 1 mole of hydrogen per mole of ether had been taken up. Infrared spectrophotometric examination of the product showed practically complete elimination of the methylene unsaturation, showing that the terminal methylene unsaturation had been selectively hydrogenated. This partly saturated ether exhibited absorption bands common to trans-piperitol as might have been expected, since it contained much of the ether of this material. Further hydrogenation reduced the piperityl ether to a menthyl isopropyl ether.

Example 7

24 grams of an isomenthyl methyl ether fraction produced by pyrolyzing verbenyl methyl ether and hydrogenating the resultant isopiperitenyl methyl ether was refluxed and stirred with a concentrated zinc chloride solution $d^{25}$ 2.12 for 4 hours. At the end of the period the mixture was cooled, water added, and the organic layer separated and washed with water, then dried with soda ash. Infrared spectrophotometric examination showed that the ether group had been practically quantitatively removed and the resulting hydrocarbon was rich in 3-menthene.

Example 8

Verbenyl cyclohexyl ether, prepared from verbenol and cyclohexanol, was pyrolyzed by refluxing at atmospheric pressure. The temperature reached 280° C. for a few minutes at the beginning and the reflux temperature dropped below 250° C. as the pyrolysis proceeded. Final temperature at reflux was 225° C. Total time was 6½ hours.

Infrared spectrophotometric examination showed that this pyrolysis followed the pattern of the previous examples. There was good retention of the ether group, formation of a strong

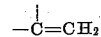

$$-\overset{|}{C}=CH_2$$

absorption characteristic of the isopiperitenyl group, and there was present a small amount of carbonyl compounds.

Example 9

500 grams of verbenyl methyl ether, about half trans-, half cis-, was heated in an autoclave at 210° C. for about 150 hours. The resulting isopiperitenyl ethers were isolated by fractionation and boiled over the range 81–84° C. at 10 mm. Selective hydrogenation of the isopropenyl group was accomplished by hydrogenating the monocyclic ethers using $PtO_2$ catalyst and 30 to 50 lbs. per square inch hydrogen pressure at about 40° C. Hydrogenation was stopped when one mole of hydrogen was absorbed per mole of ether. The hydrogenated product boiled over the range 77 to 82° C. at 10 mm. and an infrared spectrum of this product showed that the isopropenyl group had been converted to the isopropyl group, and therefore the product had been converted to piperitol methyl ethers. This was confirmed by boiling a portion of the selectively hydrogenated product with water for ten hours, separating the oil layer and fractionating it at 3 mm. pressure. One of the fractions of B. P. 68–74° C. consisted largely of trans-piperitol, identified by means of its infrared spectrum. The identity of the selectively hydrogenated ether was also proved by oxidizing it with aqueous chromic acid directly to piperitone which was identified by comparison of its infrared spectrum and ultraviolet spectrum with spectra of a known sample of piperitone.

It is to be appreciated that verbenol and verbenyl ethers exist in cis- and trans-forms. The higher boiling form is believed to be trans-. Although both forms of verbenol are known and are available by known methods of synthesis, the trans-form is best known, since it is usually the predominant form present in verbenol from most types of synthesis. However, the cis-form is usually present to some extent. The verbenols can be separated, if desired, by crystallization or fractionation and combinations of these processes. Similarly, the cis- and trans-forms of the verbenyl ethers are present in the crude verbenyl ethers produced by treating verbenol with alcohol as disclosed in copending application, Serial No. 368,208, although the pure ethers could be synthesized, if desired, from the pure cis- and trans-verbenol by methods calculated to avoid interconversions of the cis- and trans-verbenyl structure, for example, by treating the pure cis- or trans-sodium verbenylate with an alkyl halide. However, mixtures of cis- and trans-verbenyl ethers are separable as by fractionation also. Thus, we may choose to pyrolize a pure cis- or trans-verbenyl ether though in general if the crude mixtures are more readily available, we may prefer to employ them.

We have found that diverbenyl ether is produced frequently as a by-product of producing mixed verbenyl ethers, that it is formed by heating verbenyl carbonate produced by ester exchange of ethyl carbonate and verbenol in the presence of a trace of alkali alkoxide, by treating sodium verbenylate with verbenyl chloride, etc. This compound can possibly exist as di-transverbenyl ether, di-cis-verbenyl ether or cis-verbenyl-trans-verbenyl ether, all of which pyrolyze to corresponding forms of isopiperitenyl ethers, etc.

Fortunately, the above and other steric complexities do not diminish the value of our pyrolysis procedure for synthesis of 3-oxygenated derivatives of p-menthane, because such complexities are resolvable easily during subsequent treatment of the pyrolysis products.

Thus, for example, we can process cis- or trans-verbenyl ethers or mixtures of these to obtain the corresponding cis- or trans-isopiperitenyl ethers or mixtures of these, then hydrolyze the ethers to a system of alcohols, each of which can be oxidized to the same compound, isopiperitenone. Further the optical activity, if any, possessed by the verbenyl ether is retained throughout the pyrolysis step and the hydrolysis step so that the isopiperitenone will possess the degree of optical activity possessed by the starting verbenyl ether unless the isopiperitenone is itself racemized by heat or by bases during its isolation due to improper handling. Similar considerations apply to conversion of the cis-trans forms of the various suitable verbenyl ethers to piperitone either by selective hydrogenation of the intermediate isopiperitenyl ether to the piperityl ether followed by hydrolysis and oxidation or by selective hydrogenation of the isopiperitenone produced by the method already described. It is evident from the foregoing that we are not particularly concerned with the steric purity of the verbenyl ether employed for pyrolysis nor in fact the identity of the group R, Formula IV, beyond those considerations already described.

It should be pointed out also that while it has been stated that an ether of trans-isopiperitenol yields trans-isopiperitenol on hydrolysis, some cis-isopiperitenol as well as both cis- and trans-forms of the allylomeric alcohol, 2,8-p-menthadiene-1-ol, are also formed. However, upon acidic oxidation, these all produce the same isopiperitenone. Similar considerations apply, of course, to the production of piperitone. The ethers themselves also can be subjected to acid oxidation under conditions shown to convert secondary alcohols to ketones, with the production of the same ketone as is produced when the oxidation is preceded by a separate hydrolysis step.

Having described the invention, we claim:

1. A process for producing new terpenic ethers which consists essentially in heating a verbenyl compound, said compound being an ether of verbenol and an alcohol under non-acidic conditions in the temperature range of about 175° C. to about 700° C. for a sufficient time to cause appreciable isomerization to a mixture containing an isomeric unsaturated terpenic ether of the p-menthane series and an isomeric unsaturated terpenic ether of the pinane series.

2. A process for producing an isopiperitenyl ether which consists essentially in heating a verbenyl compound, said compound being an ether of verbenol and an alcohol under non-acidic conditions in the temperature range of about 175° to about 700° C. until substantial isomerization to an isopiperitenyl ether takes place and recovering the isopiperitenyl ether from the pyrolyzate.

3. The process of claim 2 where the verbenyl ether possesses optical activity due to the verbenyl moiety thereof.

4. A process for producing a menthyl ether which consists essentially in heating a verbenyl compound, said compound being an ether of verbenol and an alcohol under non-acidic conditions in the temperature range of about 175° to about 700° C. until substantial isomerization to an isopiperitenyl ether has occurred and hydrogenating the resultant isopiperitenyl ether to a menthyl ether.

5. A process which consists essentially in heating a verbenyl compound, said compound being an ether of verbenol and an alcohol under non-acidic conditions in the temperature range of about 175° to about 700° C. until substantial isomerization has occurred, submitting the pyrolyzate to a fractional distillation and recovering from said distillation fractions enriched in a ψ verbenyl ether.

6. A process which consists essentially in heating a verbenyl compound, said compound being an ether of verbenol and an alcohol under non-acidic conditions in the temperature range of about 175° to about 700° C. until substantial isomerization has occurred, submitting the pyrolyzate to a fractional distillation and recovering from said distillation fractions enriched in an isopiperitenyl ether.

7. A process for producing isopiperitenone which consists essentially in heating a verbenyl compound, said compound being an ether of verbenol and an alcohol under non-acidic conditions in the temperature range of about 175° to about 700° C. until a substantial conversion to an isopiperitenyl ether has occurred, hydrolyzing the isopiperitenyl ether with a non-alkaline aqueous medium and oxidizing the resultant mixture of alcohols with chromic acid to obtain isopiperitenone.

8. The process of claim 7 where the verbenyl ether possesses optical activity due to the verbenyl moiety.

9. The process of claim 7 where the verbenyl ether is verbenyl methyl ether.

10. The process for producing a menthol which consistss essentially in heating a verbenyl compound, said compound being an ether of verbenol and an alcohol under non-acidic conditions in the temperature range of about 175° to about 700° C. until substantial isomerization to an isopiperitenyl ether has occurred, hydrolyzing the resultant isopiperitenyl ether with a non-alkaline aqueous medium and hydrogenating the isopiperitenol thus produced to a menthol.

11. The process of claim 10 where the verbenyl ether possesses optical activity due to the verbenyl moiety.

12. The process of claim 10 where the verbenyl ether is verbenyl methyl ether.

13. A process for producing 3-menthene which consists essentially in heating an ether of verbenol and an alcohol under non-acidic conditions in the temperature range of about 175° to about 700° C. until substantial isomerization to an isopiperitenyl ether has occurred, hydrogenating the isopiperitenyl ether to a menthyl ether and splitting out the elements of an alcohol from the menthyl ether by treatment with an acidic reagent to produce 3-menthene.

14. An isopiperitenyl compound, said compound being ether of isopiperitenol and an alcohol.

15. Ethers of the formula

wherein R is a non-aromatic hydrocarbon radical containing not more than six carbon atoms.

16. Ethers selected from the class consisting of (1) verbenyl compounds which are ethers of verbenol and another alcohol, and (2) pseudo-verbenyl compounds which are ethers of pseudo-verbenol and another alcohol.

17. Ethers of the formula

wherein R is a non-aromatic hydrocarbon radical containing not more than six carbon atoms.

18. A pseudo-verbenyl ether, said ether being an ether of pseudo-verbenol and another alcohol.

References Cited in the file of this patent

UNITED STATES PATENTS

| | | |
|---|---|---|
| 2,136,011 | Humphrey | Nov. 8, 1938 |
| 2,151,769 | Humphrey | Mar. 28, 1939 |
| 2,340,294 | Bain | Feb. 1, 1944 |
| 2,360,898 | Sarbach | Oct. 24, 1944 |
| 2,537,638 | Kitchen | Jan. 9, 1951 |

OTHER REFERENCES

Simonsen et al.: The Terpenes, vol. I (2nd ed., 1947), pp. 409–410, publ. by Macmillan, New York.

Simonsen et al.: The Terpenes, vol. II (2nd ed., 1949), pp. 214–216, publ. by Macmillan, New York.

Nomenclature for Terpene Hydrocarbons, Advances in Chemistry Series, Amer. Chem. Soc. (1955), p. 93.